M. J. B. BARBAROU.
STEERING MECHANISM FOR AUTOMOBILES.
APPLICATION FILED MAR. 10, 1920.
1,413,650.
Patented Apr. 25, 1922.
3 SHEETS—SHEET 1.
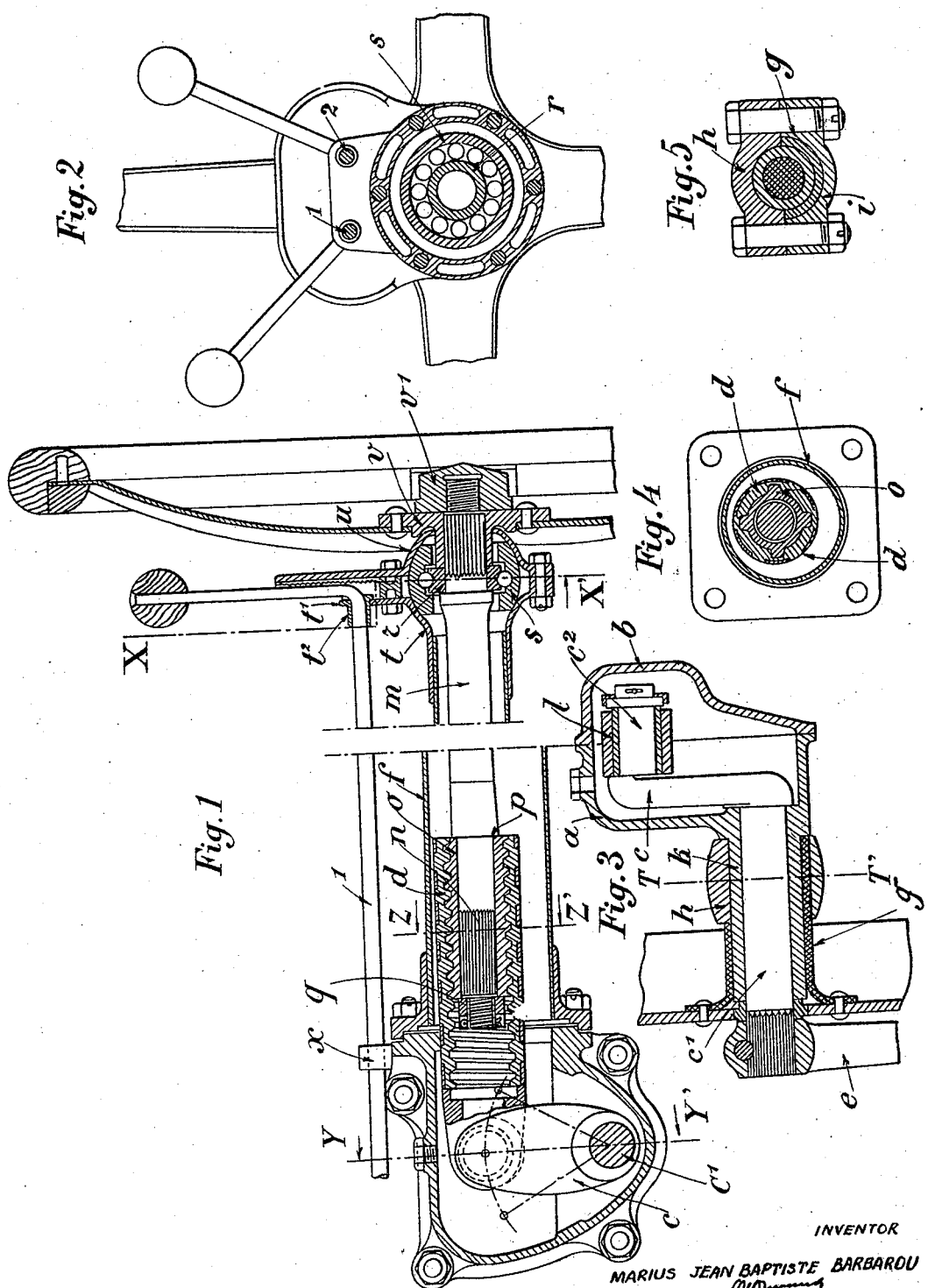
INVENTOR
MARIUS JEAN BAPTISTE BARBAROU
By *(signature)*
HIS ATTORNEY

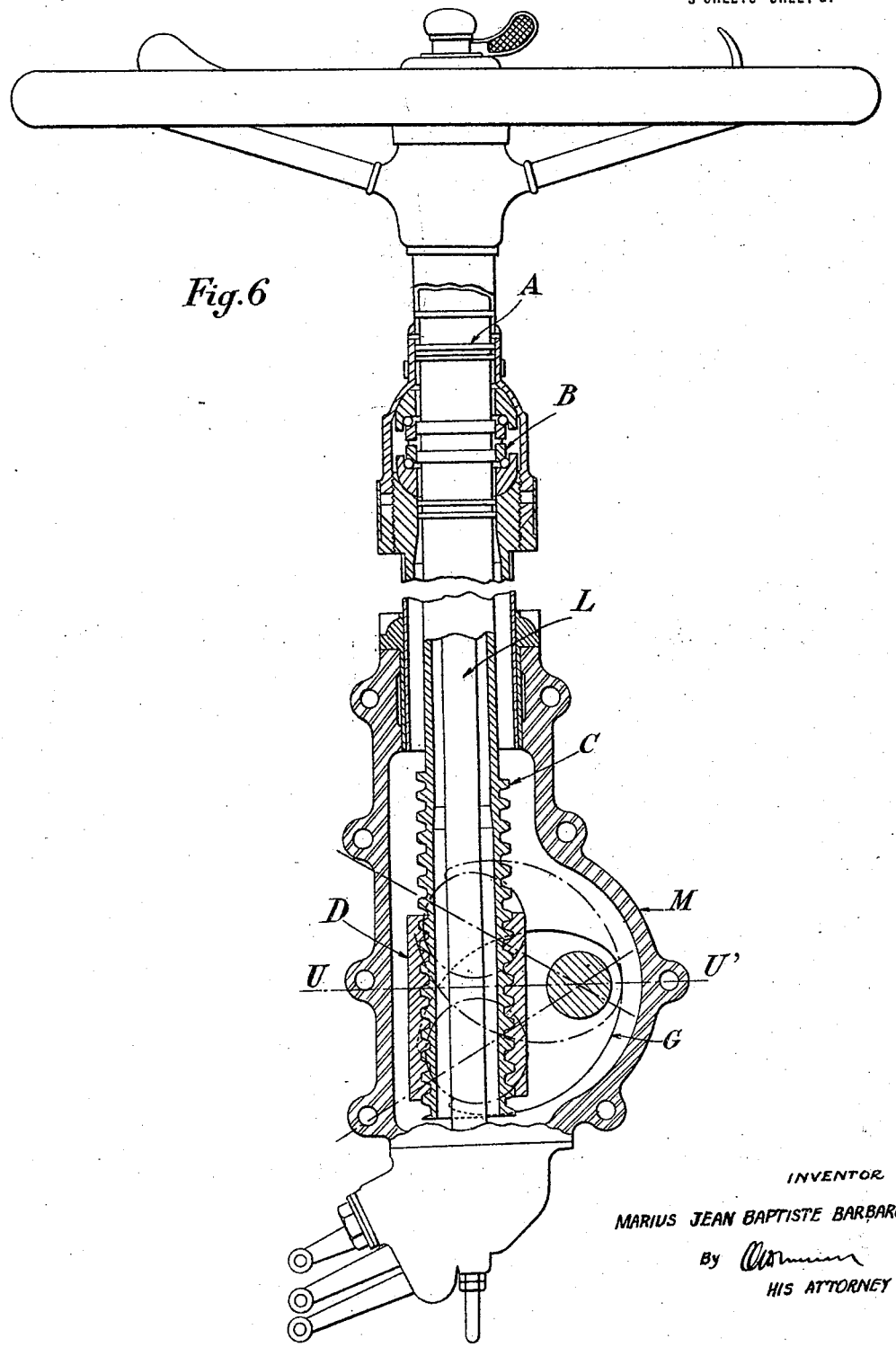

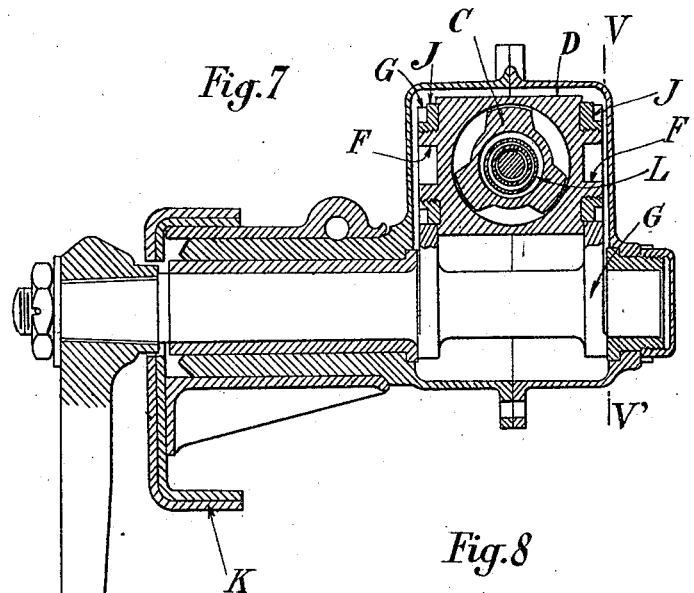
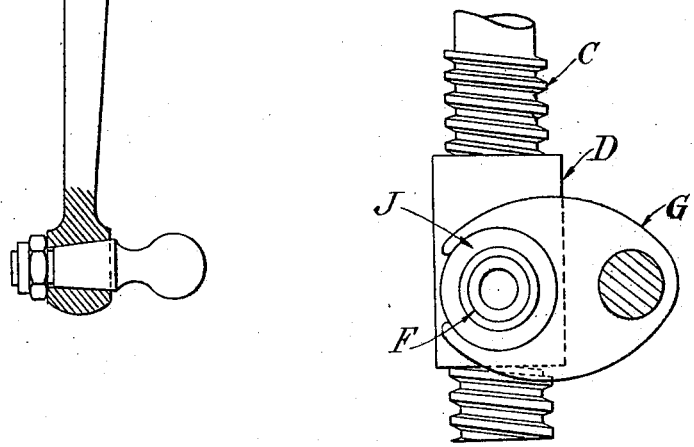

UNITED STATES PATENT OFFICE.

MARIUS JEAN BAPTISTE BARBAROU, OF PARIS, FRANCE.

STEERING MECHANISM FOR AUTOMOBILES.

1,413,650.  Specification of Letters Patent. Patented Apr. 25, 1922.

Application filed March 10, 1920. Serial No. 364,703.

*To all whom it may concern:*

Be it known that I, MARIUS JEAN BAPTISTE BARBAROU, a citizen of the Republic of France, residing at 28 Place St. Ferdinand, Paris, in the Republic of France, have invented new and useful Improvements in Steering Mechanisms for Automobiles, of which the following is a specification.

This invention relates to steering mechanisms for automobiles of the kind in which the steering shaft carries at its lower end a screw in engagement with a nut, the axial movement of which is transmitted to the wheel operating gear by means of a pivoted lever.

In accordance with one feature of this invention, the said pivoted lever has its upper end directly hinged to the nut and the steering shaft is mounted in such a manner that it may swing freely round a point located adjacent the steering wheel whereby the lower end thereof is adapted to follow the angular motion of the swinging lever.

Other features of this invention reside in constructional details of the steering mechanism in order to obtain a simple and strong construction, facilitate the mounting and dismounting and secure a greater smoothness in steering.

In the annexed drawings, showing by way of examples, two forms of embodiment of this invention:

Fig. 1 is a longitudinal axial section showing one form of steering mechanism, the middle portion being broken away.

Fig. 2 is a section on line X X' of Fig. 1 as seen in the direction of the arrows.

Fig. 3 is a section on line Y Y' of Fig. 1 as seen in the direction of the arrows.

Fig. 4 is a section on line Z Z' of Fig. 1 as seen in the direction of the arrows.

Fig. 5 is a section on line T T' of Fig. 3.

Fig. 6 is a longitudinal axial section showing another form of steering mechanism.

Fig. 7 is a section on line U U' of Fig. 6.

Fig. 8 is a fragmentary section on line V V' of Fig. 7, the casing being removed.

As shown in Figs. 1 to 5, the steering mechanism is supported at the bottom by a casing $a$ closed by a lid $b$ and containing the swinging lever $c$ integral with a rock shaft $c^1$ which is supported in a bearing $k$ integral with the casing $a$. The end of shaft $c^1$ on the opposite side with respect to the lever $c$ carries an arm $e$ which is connected with the connecting rod of the steering gear. The lever $c$ is provided with a stud $c^2$ engaging a lug $l$ provided at the lower end of a nut $d$ mounted upon a screw $o$ carried by the fluted lower end $n$ of the steering shaft $m$, the axial motion of said screw being prevented by a shoulder $p$ on said shaft on one side and a nut $q$ on the other side. The nut $d$ consists of a steel tube or casing which is provided internally with a screw-threaded lining obtained by casting.

The casing $a$ is secured to the chassis in the following manner: A flanged tubular member $g$ riveted to the chassis is cut out to receive the upper member $h$ of a clamp engaging the tubular or bearing part $k$ of the casing $a$, said member $h$ having a flat face engaging the lips formed on tube $g$ by said cut out part. The lower member $i$ of said clamp is fastened to the upper member $h$ by means of bolts, whereby a positive clamping of tube $g$ upon the bearing $k$ and of the upper clamp member $h$ upon the shaft $c^1$ is secured, every angular motion of the casing $a$ after the same is mounted in its final position being effectively prevented.

The upper end of the steering shaft carries the inner ring $r$ of a thrust ball bearing, the outer ring $s$ of which has a spherical shape and constitutes the ball member of a ball-and-socket joint having for its purpose to permit the steering pillar $m$ to swing freely while preventing longitudinal motion of said pillar. The socket member or casing of said joint comprises two sheet metal stampings $t, u$ which are dished so as to provide spherical parts cooperating with the outer spherical surface of the ring $s$. The two stampings $t, u$ are fastened together by means of stay-bolts so that they enclose the ball member of the ball-and-socket joint without play though without exerting thereupon a degree of pressure such as would prevent said member from being moved angularly. The stamping $t$ is rigidly secured to the casing $a$ by means of a conical tube $f$ surrounding the shaft $m$ and carrying at one end a flange member bolted to the casing $a$, said tube being fitted at the other end into the stamping $t$.

The thrust bearing is held in position with respect to the pillar $m$ by a hub member $v$ fitted on the fluted upper end of the pillar $m$ and rotatable therewith, said hub member being pressed upon the inner ring $r$ by a nut $v^1$ engaging the screw-threaded end of the shaft $m$. The hub member $v$ overlaps the circular edge of the upper stamping $u$, thus preventing the entrance of dirt and dust.

The hub member carries the arms of the operating hand wheel for the steering mechanism.

The auxiliary shafts 1, 2 (Figs. 1 and 2) used for operating the carburetor, the igniting device, etc., may be arranged in a very simple manner as follows: The casing $a$ and the lid thereof $b$ are provided with two perforated lugs or bosses $x$ serving as lower guides for these shafts 1, 2, the upper guiding member being formed by an extension on stamping $t$ provided with holes in which are inserted guiding rings $t^2$.

The shafts 1, 2 are provided at their upper end with arms or bent parts serving as operating handles and which may be held in any desired position around the centre lines of the shafts by means of notches on said handles engaging a toothed quadrant on the stamping $u$.

In the embodiment shown in Figs. 6 and 7, the nut D carries two side trunnions F upon which are mounted two bifurcated members G used in the place of the swinging lever $c$ of Figs. 1 to 5. The free ends of the members G are sufficiently spaced apart to allow the insertion of the trunnions F which are then held in position by means of bushings J screwed upon said trunnions F.

The steering shaft A to which the handwheel V is rigidly secured carries a double thrust bearing B. The inner races of said bearing are rigidly secured to the pillar A and the outer races constitute the ball member of a ball-and-socket joint allowing the steering pillar to effect a slight angular motion when operating the steering gear. The socket member of said joint is made of two parts screwed together, the lower one being provided at the upper end of a tube surrounding the pillar A, said tube being rigidly secured to the casing M. The casing M is secured to the chassis K and the device is besides supported by the dash-board by any suitable means not shown.

In this embodiment, the steering shaft which is preferably integral with the screw is made hollow throughout its length which allows of mounting the auxiliary operating shafts inside said steering shaft, concentrically therewith.

In both embodiments, the thrust bearing is adapted to sustain the compression and tension stresses due to the operation of the steering device.

Having now described my invention, what I claim as new and desire to secure by Letters Patent is:

1. A steering mechanism for automobiles, comprising in combination a casing embodying a sleeve part, means for clamping said sleeve part to the chassis of an automobile, a pivoted lever journalled and enclosed in said casing and adapted to be connected to the wheel operating member, a nut pivotally connected to said lever, a screw engaging in said nut, a steering shaft upon which said screw is secured, a spherical thrust ball bearing for said shaft and a tubular outer member connecting rigidly said spherical thrust ball bearing to the said casing.

2. A steering mechanism for automobiles comprising in combination a fixed bearing, a crank having two slotted arms journalled in said bearing and adapted to be connected to the wheel operating member, a nut provided with two lateral trunnions journalled in said slotted arms, the slots in the said arms having at their free ends a width greater than the diameter of said trunnions, nuts on the trunnions having a diameter greater than the width of said slots at their free ends, a screw engaging in said nut, a steering shaft upon which said screw is secured and means for rotatably supporting the steering shaft and preventing any longitudinal movement thereof, said means permitting the steering shaft to swing in a plane at right angles with the axis of the said lever.

In testimony whereof I have signed my name to this specification.

MARIUS JEAN BAPTISTE BARBAROU.